United States Patent [19]
Takahashi et al.

[11] Patent Number: 4,710,626
[45] Date of Patent: Dec. 1, 1987

[54] RADIATION IMAGE RECORDING AND READ-OUT METHOD AND APPARATUS

[75] Inventors: Kenji Takahashi; Chiyuki Umemoto; Hisatoyo Kato, all of Kanagawa, Japan

[73] Assignee: Fuji Photo Film Co., Ltd., Kanagawa, Japan

[21] Appl. No.: 883,287

[22] Filed: Jul. 7, 1986

Related U.S. Application Data

[63] Continuation of Ser. No. 484,738, Apr. 13, 1983.

[30] Foreign Application Priority Data

May 19, 1982 [JP] Japan .................. 57-84437

[51] Int. Cl.$^4$ .................................. G03C 5/16
[52] U.S. Cl. ...................... 250/327.2; 250/484.1
[58] Field of Search ..................... 250/327.2, 484.1

[56] References Cited
U.S. PATENT DOCUMENTS

| | | | |
|---|---|---|---|
| 2,756,343 | 7/1956 | Johnson | 250/337 |
| 3,444,372 | 5/1969 | De Hart | 250/484.1 |
| 4,258,264 | 3/1981 | Kotera et al. | 250/327.2 |
| 4,310,886 | 1/1982 | Kato et al. | 250/327.2 |
| 4,336,154 | 6/1982 | Nishimura et al. | 250/327.2 |
| 4,350,893 | 9/1982 | Takahashi et al. | 250/327.2 |
| 4,438,333 | 3/1984 | Teraoka et al. | 250/327.2 |
| 4,439,866 | 3/1984 | Kato et al. | 250/327.2 |
| 4,527,060 | 7/1985 | Suzuki et al. | 250/327.2 |
| 4,543,479 | 9/1985 | Kato | 250/327.2 |

Primary Examiner—Carolyn E. Fields
Attorney, Agent, or Firm—Sughrue, Mion, Zinn, Macpeak & Seas

[57] ABSTRACT

In a radiation image recording and read-out system in which a radiation image is once recorded on a recording material comprising a stimulable phosphor layer, the recording material is then scanned with a laser beam, and light emitted from the recording material is photoelectrically read out to reproduce a visible image, a gas ion laser beam having a wavelength shorter than 600 nm is employed as the laser beam. The recording material is fixed on a supporting material, circulated and reused to record radiation images thereon. The apparatus comprises a mechanism for circulating the recording material with respect to the image read-out section by repeatedly moving the supporting material and the image read-out section with respect to each other, and an erasing apparatus for eliminating the radiation energy remaining in the recording material after the read-out step. The supporting material is an endless belt, a rotatable drum or a plate, and the recording material is a continuous phosphor layer or a phosphor sheet.

21 Claims, 12 Drawing Figures

RADIATION IMAGE RECORDING AND READ-OUT METHOD AND APPARATUS

This is a continuation of application of application Ser. No. 484,738, filed Apr. 13, 1983.

BACKGROUND OF THE INVENTION

1. Field of the Invention

This invention relates to a radiation image recording and read-out method and an apparatus for carrying out the method. More particularly, this invention relates to a radiation image recording and read-out method in which a stimulable phosphor is once exposed to a radiation to have a radiation image stored therein, the stimulable phosphor is scanned with stimulating rays which cause the stimulable phosphor carrying the radiation image to emit light in the pattern of the radiation image stored therein, the emitted light is photoelectrically read out to obtain an electric signal, and a visible image is reproduced by use of the obtained electric signal, and an apparatus for carrying out the method.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to a stimulating ray such as visible light, light is emitted from the phosphor in proportion to the stored energy of the radiation. A phosphor exhibiting such properties is referred to as a stimulable phosphor.

As disclosed in U.S. Pat. No. 4,258,264, it has been proposed to use a stimulable phosphor in a radiation image recording and read-out method, particularly for medical diagnosis. Specifically, a recording material comprising the stimulable phosphor is first exposed to a radiation passing through an object to have a radiation image stored therein, and is then scanned with a laser beam which has a wavelength within the stimulation wavelength range for the stimulable phosphor and which causes the stimulable phosphor to emit light in the pattern of the stored image. The light emitted from the stimulable phosphor upon stimulation thereof is photoelectrically detected and converted to an electric image signal, which is processed as desired to reproduce a visible image on a recording medium such as a photographic film or on a display device such as a cathode ray tube (CRT).

This radiation image recording and read-out method using the stimulable phosphor is advantageous over conventional radiography using a silver halide emulsion, for example, in that the electric image signal used for reproducing the visible image can be freely processed according to the structure of the object to improve the image quality for viewing, particularly for diagnostic purposes, and further in that the radiation dose to the object can be greatly reduced by adjusting the read-out gain of the photodetector used to convert the light emitted from the stimulable phosphor upon stimulation thereof to the electric image signal.

In the radiation image recording and read-out method described above, it is desired that the amount of light emitted from the recording material upon scanning thereof with a laser beam (i.e. the read-out amount) be as large as possible. This is because, when the read-out amount is large, conversion of the light emitted from the stimulable phosphor of the recording material into the electric image signal can be conducted at a high signal-to-noise ratio (S/N ratio), and therefore it is possible to reproduce a visible image of high quality. The read-out amount per unit area of the recording material is given by the product of stimulation energy of the stimulating rays (laser beam) applied to the recording material and the read-out efficiency, which is a variable depending on the wavelength of the stimulating rays. Accordingly, in order to improve the read-out amount, it is necessary to increase the stimulation energy and further to scan the recording material with stimulating rays having a wavelength providing a high read-out efficiency.

Aforesaid U.S. Pat. No. 4,258,264 discloses a radiation image recording and read-out method in which a radiation image stored in the recording material is read out by stimulating the recording material by use of a laser beam having a wavelength within the range of 600 nm to 700 nm and photoelectrically detecting light having a wavelength within the range of 300 nm to 500 nm among the wavelengths of light emitted from the recording material upon stimulation thereof. U.S. Pat. No. 4,258,264 also suggests that the reason for the use of the laser beam having a wavelength within the range of 600 nm to 700 nm as the stimulating rays is that, in general, a high read-out efficiency can be obtained within this wavelength range of stimulating rays. As examples of laser sources emitting light having a wavelength within the aforesaid range, U.S. Pat. No. 4,258,264 mentions an He-Ne laser (633 nm), a Kr+ laser (647 nm) and a Rhodamine B dye laser (610 nm to 680 nm).

When medical diagnosis is conducted by use of the above-mentioned radiation image recording and read-out method, it is often necessary to sequentially record radiation images of patients at short recording intervals, for example, as in the case of mass medical examinations. In such a case, the radiation image recording and read-out method is required to be able to quickly read out a radiation image from the recording material after the radiation image is recorded thereon. Thus, there is an increasing need for a radiation image recording and read-out method capable of quickly reading out a radiation image from the recording material. Further, for carrying out such a method, it is practically desired to use an apparatus in which the recording material repeatedly used for recording radiation images is incorporated into a single unit together with a recording section for recording radiation images of patients on the recording material and a read-out section for reading out the radiation images recorded on the recording material. Since the stimulation energy per unit area of the recording material is given by the product of the output of the stimulating rays employed for the scanning of the recording material and the read-out time for the recording material, when the stimulation energy is constant, the read-out time for the recording material can be shortened by increasing the output of the stimulating rays.

As described above, in the aforesaid radiation image recording and read-out method, it is desired that the read-out amount in the scanning of the recording material with stimulating rays be as large as possible. Further, the radiation image recording and read-out method is desired to be able to quickly read out a radiation image from the recording material after the radiation image is recorded on the recording material. As explained above, the read-out amount per unit area of the recording material is given by the formula:

read-out amount = read-out efficiency × stimulation energy in which the read-out efficiency is a variable depending on the wavelength of stimulating rays. On the other hand, the stimulation energy per unit area of the recording material is given by the formula:

stimulation energy = read-out time × stimulating ray output.

Accordingly, read-out amount = read-out efficiency × read-out time × stimulating ray output.

As indicated by this formula, in order to shorten the read-out time for the recording material and still increase the read-out amount, it is necessary to greatly increase the output of stimulating rays.

The inventors conducted various experiments to find a radiation image recording and read-out method employing a high-output laser beam as the stimulating rays so that the stimulation energy can be increased even when the read-out time for the recording material is shortened, making it possible to increase the read-out amount. Surprisingly, these experiments revealed that dependence of the read-out efficiency on the wavelength of the stimulating rays changes according to the stimulation energy. More specifically, it has been found that a higher read-out efficiency is obtained with stimulating rays having a wavelength within the range of 600 nm to 700 nm when the stimulation energy is low, but the read-out efficiency is improved with stimulating rays having a wavelength shorter than 600 nm over the read-out efficiency obtained with the stimulating rays having a wavelength within the range of 600 nm to 700 nm as the stimulation energy increases. Accordingly, when a laser beam having a considerably high output like a gas ion laser beam is used as the stimulating rays to shorten the read-out time for the recording material and still increase the read-out amount, a higher read-out amount can be obtained by selecting a laser beam having a wavelength shorter than 600 nm rather than a laser beam having a wavelength within the range of 600 nm to 700 nm.

SUMMARY OF THE INVENTION

The primary object of the present invention is to provide a radiation image recording and read-out method in which a radiation image recorded on a recording material can be quickly read out at a high read-out efficiency.

Another object of the present invention is to provide an apparatus for carrying out the radiation image recording and read-out method.

The specific object of the present invention is to provide a radiation image recording and read-out method and an apparatus for carrying out the method, which are suitable for use in a mobile X-ray diagnostic station.

The present invention provides a radiation image recording and read-out method including the steps of:
(i) recording a radiation image of an object on a recording material comprising a stimulable phosphor layer by exposing said recording material to a radiation passing through the object to have the radiation absorbed in said recording material, and (ii) scanning said recording material carrying said radiation image stored therein with a laser beam which has a wavelength within the range capable of stimulating said stimulable phosphor and which causes said recording material to emit light in the pattern of said radiation image stored therein upon stimulation thereof, and reading out the emitted light by use of a photodetector to obtain an electric signal corresponding to said radiation image, wherein the improvement comprises using a gas ion laser beam having a wavelength shorter than 600 nm as said laser beam.

The present invention also provides a radiation image recording and read-out apparatus including:
(i) at least one recording material comprising a stimulable phosphor layer and absorbing a radiation passing through an object to store a radiation image of said object therein,
(ii) a laser beam source having a wavelength within a range capable of stimulating said stimulable phosphor and used to scan said recording material carrying said radiation image stored therein to have said recording material emit light in the pattern of said radiation image upon stimulation thereof, and
(iii) a photodetector for reading out said emitted light and converting it into an electric signal corresponding to said radiation image,
wherein the improvement comprises using a gas ion laser beam source emitting a laser beam having a wavelength shorter than 600 nm as said laser source.

The term "gas ion laser" means a high-output gas laser, such as an $Ar^+$ laser (488 nm, 514.5 nm). By way of comparison, the He-Ne laser beam employed as the stimulating rays in the radiation image recording and read-out method described in aforesaid U.S. Pat. No. 4,258,264 exhibits the maximum output of approximately 50 mW, whereas the maximum output of the $Ar^+$ laser employed in the present invention is approximately 500 mW, approximately 10 times larger. Accordingly, in the radiation image recording and read-out method in accordance with the present invention, in which the $Ar^+$ laser beam is used as the stimulating rays, even when half of the approximately ten-fold increase in the output of the stimulating rays obtained by the replacement of the He-Ne laser beam with the $Ar^+$ laser beam is utilized for shortening the read-out time for the recording material and the radiation image stored in the recording material is read out over a period equal to one fifth of the read-out time required in the radiation image recording and read-out method using the He-Ne laser beam as the stimulating rays as described in the aforesaid U.S. Pat. No. 4,258,264, the remaining half of the increase in the output of the stimulating rays is utilized for an increase in the stimulation energy, and thus the stimulation energy increases to a level two times the stimulation energy available in the method described in aforesaid U.S. Pat. No. 4,258,264. When the stimulation energy is increased, a higher read-out efficiency is obtained with a wavelength shorter than 600 nm rather than with a wavelength in the range of 600 nm to 700 nm. Accordingly, the radiation image recording and read-out method in accordance with the present invention, in which the $Ar^+$ laser beam having a wavelength shorter than 600 nm is employed as the stimulating rays, makes it possible to read out the radiation image stored in the recording material at a high read-out efficiency. A high read-out efficiency means a large read-out amount (amount of light emitted from the recording material upon stimulation thereof), and consequently means that conversion of the light emitted from the recording material upon stimulation thereof into an electric signal can be conducted at a high S/N ratio, and a visible image having a high quality can be reproduced by use of the electric signal.

As the gas ion laser beam having a wavelength shorter than 600 nm and employed as the stimulating rays in the present invention, for example, the aforesaid Ar+ laser beam (488 nm, 514.5 nm), a Kr+ laser beam (520.9 nm, 530.9 nm, 568.2 nm), or an Ar+-Kr+ laser beam is preferable. Among these gas ion laser beams, the Ar+ laser beam is particularly preferable.

As the stimulable phosphor, for example, rare earth element activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0<x+y\leq 0.6$ and $xy\neq 0$, and a is a number satisfying $10^{-6}\leq a\leq 5\times 10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leq x\leq 0.6$, and y is a number satisfying $0\leq y\leq 0.2$. Further, as the stimulable phosphor can be used ZnS:Cu,Pb; $BaQ.xAl_2O_3:Eu$ wherein $0.8\leq x\leq 10$; and $M^{II}O.x SiO_2:A$ wherein $M^{II}$ is Mg, Ca, Sr, Zn, Cd or Ba, A is Ce, Tb, Eu, Tm, Pb, Tl, Bi or Mn, and x is a number satisfying $0.5\leq x\leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, and x is a number satisfying $0<x<0.1$, as shown in U.S. Pat. No. 4,236,078. Among the above enumerated phosphors, the rare earth element activated alkaline earth metal fluorohalide phosphor is the most preferable, among which barium fluorohalides are the most preferable in view of the high intensity of emission of light.

Further, barium fluorohalide phosphors added with a metal fluoride as disclosed in EP No. 29963A, or barium fluorohalide phosphors added with at least one of a metal chloride, a metal bromide and a metal iodide as disclosed in European Patent Publication No. 29,963 are also preferable because of their improved light emitting characteristics.

In general, the above enumerated stimulable phosphors can be stimulated with light having a wavelength within the range of 450 nm to 700 nm, and emit light having a wavelength within the range of 300 nm to 500 nm upon stimulation thereof.

The recording material employed in the present invention comprises a stimulable phosphor layer. In general, the stimulable phosphor layer is composed of an organic binder, and stimulable phosphor grains dispersed in the organic binder. The stimulable phosphor layer may be colored by use of pigments or dyes as disclosed in U.S. patent appln. Ser. No. 156,520 (European Patent Publication No. 21,174, now U.S. Pat. No. 4,304,581) or may be formed by dispersing white powder together with the stimulable phosphor grains in the organic binder as disclosed in U.S. Pat. No. 4,350,893, thereby to improve the sharpness of the image obtained.

The recording material may be constituted by the stimulable phosphor layer only, or may be a composite comprising the stimulable phosphor layer provided on an appropriate supporting material such as a plastic sheet. In a preferred embodiment of the radiation image recording and read-out apparatus in accordance with the present invention, the recording material is used in the form fixed to an endless supporting material such as an endless belt or a rotatable drum, or a plate-like supporting material.

The read-out efficiency in the read-out conducted by scanning the recording material carrying a radiation image stored therein with the stimulating rays changes depending on the wavelength of the stimulating rays. Further, surprisingly, the dependence of the read-out efficiency on the wavelength of the stimulating rays changes according to the level of stimulation energy. FIG. 1 is a graph showing the manner in which the dependence of the read-out efficiency for the recording material employed in the present invention on the wavelength of the stimulating rays changes according to the level of stimulation energy. This graph was obtained by use of a recording material comprising a $BaFBr:Eu^{2+}$ stimulable phosphor layer. In FIG. 1, curves a, b, c, d and e respectively show the dependence of the read-out efficiency on the wavelength of the stimulating rays when the stimulation energy is 6.0 $\mu J/cm^2$, 150 $\mu J/cm^2$, 300 $\mu J/cm^2$, 600 $\mu J/cm^2$ and 1,200 $\mu J/cm^2$. In each case, the read-out efficiency was measured after exposing the recording material for 60 seconds to X-rays emitted at a tube voltage of 80 kVp and a tube current of 5 mA to have a sufficient amount of X-ray energy stored therein.

As shown in FIG. 1, when the stimulating energy is low (curve a), a higher read-out efficiency is generally obtained with stimulating rays having a wavelength within the range of 600 nm to 700 nm. However, as the stimulation energy is increased (curves b, c, d and e), the read-out efficiency obtained with stimulating rays having a wavelength shorter than 600 nm becomes higher than the read-out efficiency obtained with stimulating rays having a wavelength within the range of 600 nm to 700 nm. Since the gas ion laser is a high-output laser as described above, in case the gas ion laser beam is used as the stimulating rays, it is possible to obtain higher stimulation energy even when the read-out time is shortened. In general, when the gas ion laser beam is used as the stimulating rays, it is possible to obtain stimulation energy of $600\mu J/cm^2$ (curve d) or more, depending on how much the read-out time is shortened. Accordingly, in the present invention in which the gas ion laser beam having a wavelength shorter than 600 nm is employed as the stimulating rays, the read-out can be conducted at a higher read-out efficiency and a larger read-out amount can be obtained than when a gas ion laser beam having a wavelength within the range of 600 nm to 700 nm is used.

Also for recording materials comprising stimulable phosphor layers other than the recording material comprising the $BaFBr:Eu^{2+}$ stimulable phosphor layer the data on which is shown in FIG. 1, it has been found that the dependence of the read-out efficiency on the wavelength of stimulating rays changes according to the level of stimulation energy in the same way as shown in FIG. 1 and that, as the stimulation energy increases, the read-out efficiency obtained with stimulating rays having a wavelength shorter than 600 nm becomes higher than the read-out efficiency obtained with stimulating rays having a wavelength within the range of 600 nm to 700 nm. Although the reason why this phenomenon occurs has not yet been clarified completely, it is assumed that much radiation energy is stored on a deeper trap level in the stimulable phosphor, and the radiation energy is not readily emitted from the stimulable phosphor unless high stimulation energy is applied thereto.

The photodetector employed in the present invention may be a photomultiplier, a photodiode, or the like. The photodetector is preferably used in combination with a filter capable of cutting off the gas ion laser beam employed as the stimulating rays and selectively transmitting only the light emitted from the recording material upon stimulation thereof.

In the present invention, the recording material comprising a stimulable phosphor layer is used to temporarily store the radiation image in order to reproduce the final visible image therefrom on a recording medium such as a photographic film or on a display device such as CRT. For economical reasons, therefore, it is desirable that the recording material be used repeatedly.

In order to reuse the recording material, the radiation energy remaining in the recording material after it is scanned with stimulating rays to read out the radiation image stored therein should be eliminated or erased by, for example, the method described in U.S. Pat. No. 4,400,619. Practically, it is possible to save manpower by supplying the recording material to an image erasing apparatus by use of a conveying means such as a belt conveyor after the radiation image is read out from the recording material, and returning the recording material to the image recording section by use of a similar conveying means after the radiation image remaining in the recording material is erased.

In general, however, it is not easy to design and manufacture a conveying means which can convey a sheet material like the recording material without any failure due to clogging, sheets caught at an intermediate point, or the like. Further, the recording material must be conveyed in the intact form without being scratched or flawed. This also makes it difficult to design and manufacture the conveying means. Furthermore, it sometimes happens that some recording materials are processed for reproducing the radiation images therefrom immediately after the radiation images are recorded thereon, and some are processed later together with the others. As a result, the sequence of using the recording materials is different from the recording sequence, and the new and old recording materials are sent in intermingled form to the image recording section. In this case, it is impossible to obtain reproduced images of a uniform quality since the quality of the reproduced images differs between the new and old recording materials. Thus, it is desired to replace the old recording materials with new ones when necessary. For this purpose, it is necessary to inspect the quality of the images reproduced from the respective recording materials or to control the number of repetitions of the recording operations for the respective recording materials, thereby to determine whether to replace the recording materials with new ones or to reuse them for further recording operations. However, it is very troublesome to conduct quality control for individual recording materials.

Further, in a mobile X-ray diagnostic station such as a traveling X-ray diagnostic station in a vehicle such as a bus which is provided with the radiation image recording and read-out apparatus and travels for recording radiation images for the purpose of mass medical examinations, the amount of the recording materials capable of being loaded on the mobile X-ray diagnostic station is limited. Therefore, it is desired to load recording materials which can be used repeatedly on the mobile X-ray diagnostic station, once store the radiation images of the objects on the recording materials, transfer the electric image signals read out from the recording materials into a recording medium having a large storage capacity, such as a magnetic tape, and circulate and reuse the recording materials for further recording and read-out operations, thereby to obtain radiation image signals of many objects. In this case, it is not necessary to load a number of recording materials of a relatively large size (for example, of the size of a conventional X-ray film cassette).

Particularly, when the elements of the apparatus, e.g. the circulatable and reusable recording materials comprising a stimulable phosphor layer, the image recording section for exposing each recording material to a radiation passing through the object, the image read-out section comprising a gas ion laser source capable of emitting light having a wavelength shorter than 600 nm and a photodetector for reading out the radiation image stored in the recording material, and the erasing means for erasing the radiation energy remaining in the recording material after the read-out step to record another radiation image thereon, are combined into one unit, the apparatus can easily be loaded on the mobile X-ray diagnostic station to conduct medical examinations at various locations and can also be easily installed in a hospital or the like. This is very advantageous in practical use.

In a preferred embodiment of the radiation image recording and read-out apparatus in accordance with the present invention, the recording material can be circulated and reused to record radiation images, and many reproduced images of a uniform quality can be obtained easily by repeating the radiation image recording on the recording material. Further, the embodiment is easy to design, manufacture, control and move.

The preferred embodiment of the radiation image recording and read-out apparatus in accordance with the present invention comprises at least one recording material comprised of a stimulable phosphor layer and fixed on a supporting material, an image recording section for exposing said recording material to a radiation passing through an object to have a radiation transmission image of the object stored in said recording material, an image read-out section provided with a photoelectric read-out means for scanning said recording material with a gas ion laser beam which has a wavelength shorter than 600 nm and which causes said recording material to emit light and reading out the emitted light to obtain an electric image signal, a means for moving said recording material with respect to said image read-out section, and an erasing means for eliminating the radiation energy remaining in said recording material after the read-out step.

In the present invention, the electric image signal obtained in the image read-out section may then be once stored on a recording medium such as a magnetic tape or a magnetic disk, displayed on a CRT or the like for immediate observation of the radiation image, or permanently recorded as a hard copy on a photographic material or the like by use of a reproducing apparatus. The reproducing apparatus may be directly coupled with the radiation image recording and read-out apparatus in accordance with the present invention, installed separately from the radiation image recording and read-out apparatus for conducting reproduction via a memory, or placed at a remote position for conducting reproduction through radio communication. In the case mentioned last, it is possible, for example, to reproduce the radiation image recorded in the mobile X-ray diagnostic station by use of a radio signal receiver in a hospital, and transmit the results of diagnosis conducted by a radiologist to the mobile X-ray diagnostic station through radio communication.

In the preferred embodiment of the radiation image recording and read-out apparatus in accordance with the present invention, the recording materials comprised of stimulable phosphor layers for recording radiation images therein are circulated and reused in the form fixed on a supporting material. Since the recording materials are circulated and reused in order, unlike the phosphor sheets which are used in the discrete form, it is possible to always obtain reproduced images of a uniform, stable quality without any risk of the recording materials being damaged. Further, with the apparatus quality control is conducted easily since, when the recording materials have deteriorated, all the recording materials can be replaced by new ones. Since the recording materials are built in the apparatus, it is easy to handle them and to operate the apparatus. Furthermore, since the apparatus has a simple construction, it is easy to design and manufacture, and is small in size and light in weight. Accordingly, the apparatus in accordance with the present invention is very suitable for installation in a mobile X-ray diagnostic station, a hospital, or the like. This is very advantageous in practical use.

DESCRIPTION OF THE PREFERRED EMBODIMENTS

The present invention will hereinbelow be described in further detail with reference to the accompanying drawings.

Figure 1:
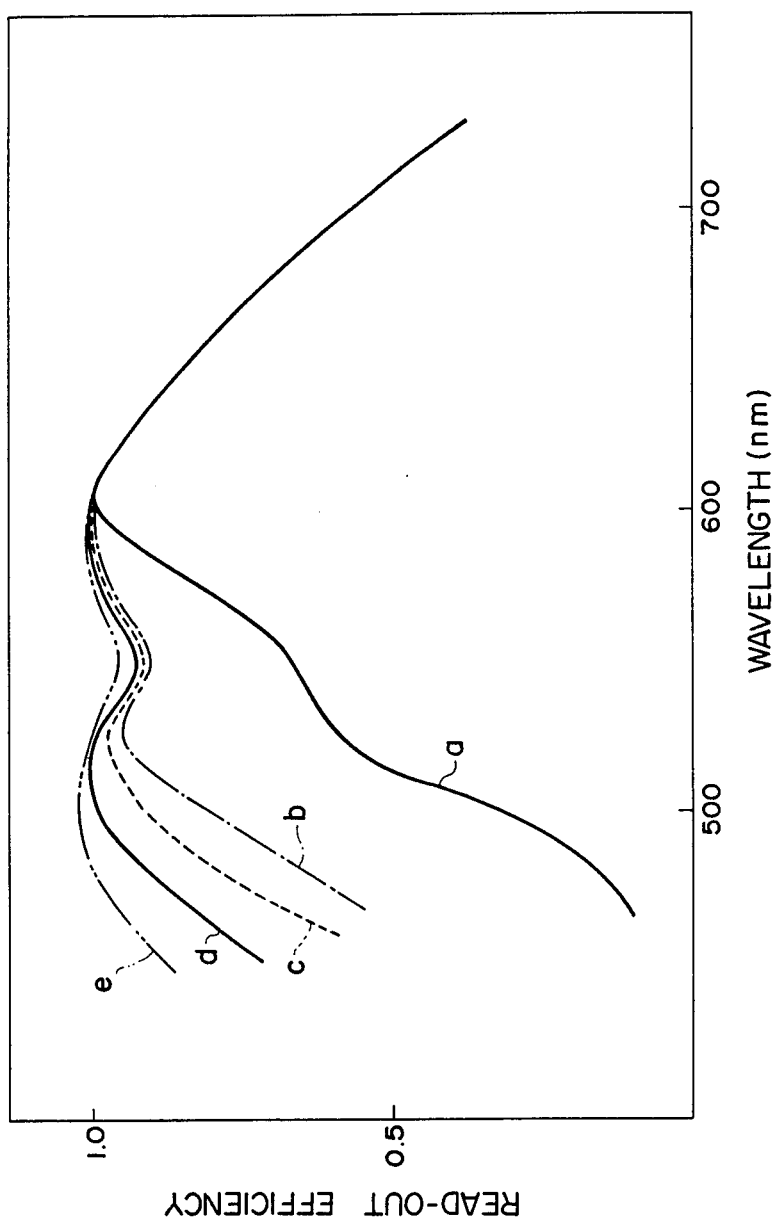
FIG. 1 is a graph showing the manner in which the dependence of the read-out efficiency for the recording material employed in the present invention on the wavelength of the stimulating rays changes according to the level of stimulation energy.
Figure 2:
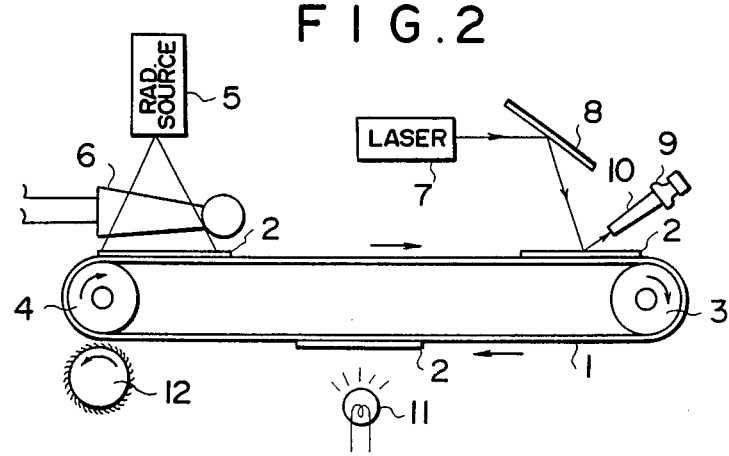
FIG. 2 is a schematic view showing the first embodiment of the radiation image recording and read-out apparatus in accordance with the present invention.

In FIG. 2, an endless conveyor 1, e.g. a belt conveyor or a chain conveyor, is used as the supporting material for supporting three stimulable phosphor sheets (recording materials) 2. These stimulable phosphor sheets 2 are fixed in equally spaced relation on the conveyor 1. The conveyor 1 provided with the phosphor sheets 2 is engaged with a driving roller 3 and a driven roller 4, and moved in the direction of the arrow by the driving roller 3 which is rotated by a drive unit (not shown). In the vicinity of the driven roller 4 is positioned a radiation source 5 to face the conveyor 1. The radiation source 5 may be an X-ray source or the like, and projects a radiation transmission image of an object 6 positioned between the phosphor sheet 2 and the radiation source 5 onto the phosphor sheet 2. In the vicinity of the driving roller 3 are positioned a gas ion laser beam source 7 for emitting stimulating rays having a wavelength shorter than 600 nm, a light deflector 8 formed of a galvanometer mirror or the like for deflecting the stimulating rays emitted from the gas ion laser beam source 7 in the width direction of the conveyor 1, and a photodetector 9 for reading out the light emitted from the phosphor sheet 2 upon stimulation thereof by the stimulating rays. The photodetector 9 may be formed of a head-on type photomultiplier, a photoelectric amplification channel plate or the like. The photodetector 9 detects the light emitted from the phosphor sheets 2 upon stimulation thereof and guided by a light transfer means 10. An erasing light source 11 is positioned to face the conveyor 1 on the side opposite to the radiation source 5, the gas ion laser beam source 7 and the photodetector 9. The erasing light source 11 emits light having a wavelength within the stimulation wavelength range of the phosphor sheets 2 irradiated onto the phosphor sheets 2 to cause them to emit the radiation energy stored therein. The erasing light source 11 may be formed, e.g., of a tungsten-filament lamp, halogen lamp, infrared lamp, or laser beam source as described in U.S. Pat. No. 4,400,619. Since the radiation energy stored in the phosphor sheets 2 can also be eliminated by heating them as disclosed, for example, in Japanese Unexamined Patent Publication No. 56(1981)-12599, the erasing light source 11 may be replaced by a heating means. A cylindrical cleaning roller 12 is opposed to the driven roller 4 with the conveyor 1 intervening therebetween. The cleaning roller 12 is rotated counterclockwise in the diagram by a drive unit (not shown), and removes dust and the like from the surfaces of the phosphor sheets 2 moving in contact with the cleaning roller 12. If necessary, the cleaning roller 12 may be of an electrostatic attraction type which collects dust and the like by an electrostatic force.

The light transfer means 10 may be of a material and a construction as disclosed in U.S. Pat. No. 4,346,295, U.S. patent appln. Ser. No. 105,240 now U.S. Pat. No. 4,346,293 and Ser. No. 168,805, now U.S. Pat. No. 4,369,367 or Japanese Unexamined Patent Publication No. 56(1981)-11395, and may be used by the methods disclosed therein.

The radiation image recording and read-out system shown in FIG. 2 is operated as described below. The conveyor 1 is intermittently moved by distances corresponding to one-third of the entire circumference thereof by the driving roller 3. The stopping positions of the conveyor 1 are set so that one phosphor sheet 2 faces the radiation source 5 when the conveyor 1 stops. When the conveyor 1 is stopped, the radiation source 5 is turned on to cause the phosphor sheet 2 facing the radiation source 5 to store the radiation transmission image of the object 6. After the radiation image is recorded on the phosphor sheet 2, the conveyor 1 is further moved the distance of one-third the conveyor circumference and stopped. At this time, the phosphor sheet 2 carrying the radiation image stored therein is stopped in the position facing the light deflector 8 and the photodetector 9, and scanned with the stimulating rays emitted from the gas ion laser beam source 7. Scanning is conducted in the width direction of the conveyor 1 (main scanning) by the light deflector 8, and also in the length direction of the conveyor 1 (subsidiary scanning) by the movement of a stage (not shown) carrying the gas ion laser beam source 7, the light deflector 8, the photodetector 9 and the light transfer means 10 in the length direction of the conveyor 1. The stage can be easily formed by use of a known linear movement mechanism. Upon exposure to the stimulating ray, the phosphor sheet 2 emits light in the pattern of the radiation image stored therein. The emitted light is inputted to the photodetector 9 via the light transfer means 10, and an electric signal corresponding to the radiation image stored in the phosphor sheet 2 is outputted from the photodetector 9. After the radiation image is read out in this way, the conveyor 1 is further moved the distance of one-third the circumference thereof and stopped. In this condition, the phosphor sheet 2 from which the radiation image has been read out is opposed to the erasing light source 11, and exposed to the erasing light emitted therefrom to eliminate the radiation energy of the radiation image remaining in the phosphor sheet 2 after the read-out step, the radiation emitted from radioactive isotopes such as $^{226}$Ra and $^{40}$K existing in trace amounts in the stimulable phosphor, and environmental radiations stored in the stimulable phosphor. In this way, the phosphor sheet 2 is restored to a condition usable for recording a further radiation image. Thereafter, the conveyor 1 is moved the distance of one-third the conveyor circumference until the erased phosphor sheet 2 faces the radiation source 5. Midway during this movement, dust on the surface of the phosphor sheet 2 is removed by the cleaning roller 12. The phosphor sheet 2 free from any radiation energy and dust is reused to record a radiation image at the radiation source 5.

As described above, the stimulable phosphor sheets 2 are circulated and reused through the erasing step conducted by the erasing light source 11 and the cleaning step effected by the cleaning roller 12. One phosphor sheet 2 passes through the image recording, image read-out and image erasing steps while the conveyor 1 rotates one turn. It is, of course, possible to simultaneously conduct these three steps for the three phosphor sheets 2, respectively, when the conveyor 1 is stopped. In this case, it is possible to improve the image recording and read-out speed.

In the embodiment shown in FIG. 2, since the phosphor sheets 2 are fixed on the endless conveyor 1 and reused through the circulation of the conveyor 1, there is no risk of the stimulable phosphor being damaged as there is in the method in which discrete phosphor sheets are conveyed one by one. Further, since the mechanism for circulating the phosphor sheets 2 can be formed of a simple conveyor mechanism, the system is easy to design and manufacture. Also, since the three phosphor sheets 2 are always used in a predetermined sequence, the quality of the reproduced images does not fluctuate among the phosphor sheets.

The electric image signal obtained from the photodetector 9 may immediately be sent to a reproducing apparatus to reproduce the radiation image as a hard copy or display it on a CRT, or may be digitized and temporarily stored on a high-density recording medium such as a magnetic tape, magnetic disk or optical disk to later reproduce the radiation image therefrom. When the apparatus in accordance with the present invention is loaded on a mobile X-ray diagnostic station or the like for obtaining radiation images for medical diagnosis, it is possible to reduce the number of pieces of equipment to be loaded on the mobile station by conducting the read-out and storage of the electric image signals on the high-density recording medium at the site of the recording and read-out operation, and bringing the recording medium to a medical center or the like for reproducing the radiation images. The electric image signals may also be simultaneously inputted to the reproducing apparatus and the recording medium. Namely, when the apparatus is used in a hospital, the electric image signals may be transferred from the recording and read-out station to the storage station where the image signals are temporarily stored in a recording medium and, at the same time, they may be transferred to the reproducing apparatus, e.g. a CRT, in the diagnostic room in order to immediately use them for diagnosis.

It is possible and preferable for obtaining a radiation image having a high diagnostic efficiency and accuracy to process the electric image signal in order to intensify the image and change the contrast. In the present invention, it is preferable to conduct the frequency processing as disclosed in U.S. Pat. No. 4,315,318, U.S. patent application Ser. No. 105,240 now U.S. Pat. No. 4,346,295 and Ser. No. 220,780 now U.S. Pat. No. 4,387,428; U.S. patent application Ser. No. 434,886, Japanese Unexamined Patent Publication No. 56(1981)-75141, and/or the gradation processing as disclosed in U.S. Pat. Nos. 4,302,672, 4,276,473 and 4,310,886.

In the embodiment shown in FIG. 2, the subsidiary scanning of the stimulable phosphor sheets 2 is conducted by moving the gas ion laser beam source and read-out apparatus with respect to the stationary phosphor sheets 2. However, it is also possible to maintain the gas ion laser beam source and read-out apparatus stationary, and move the phosphor sheets 2 to conduct the subsidiary scanning. In order to move the phosphor sheets 2 for this purpose, it is possible to mount the phosphor sheets 2 on the conveyor 1 via a stage, instead of directly fixing them thereon, move the stage on the conveyor 1 when the conveyor 1 is stopped to read out the radiation image, and return the stage to a predetermined position after the read-out is over. Alternatively, the phosphor sheets may be directly mounted on the conveyor 1, and the subsidiary scanning may be conducted by moving the conveyor 1. In the latter case, the distance between the image recording section and the image read-out section may be made different from the intervals between the adjacent phosphor sheets 2, and after the conveyor 1 has been moved to scan one phosphor sheet 2 in the subsidiary direction, the conveyor 1 may be moved to a position to locate the next phosphor sheet 2 at the image recording section. In this case, the image recording and the image read-out are not conducted at the same time. Further, in order to speed up the recording and read-out operation by carrying out the image recording and the image read-out in parallel with each other, it is possible to move the conveyor 1 to scan one phosphor sheet 2 in the subsidiary scanning direction while a radiation image is being recorded on the next phosphor sheet 2, which is being moved together with the conveyor 1, by use of the slit exposure method. It is also possible to use several conveyors that can automatically transfer the phosphor sheets 2 therebetween, and operate the conveyors in such a way that the phosphor sheets 2 are ultimately circulated via these conveyors. In this case, when the read-out speed is much lower than the recording speed, it becomes possible to increase the read-out speed by installing a plurality of image read-out sections per image recording section, connecting the conveyors branched from the image recording section to the respective image read-out sections, and supplying the phosphor sheets 2 to the respective image read-out sections. Further, when the phosphor sheets 2 are transferred among a plurality of conveyors as described above, it is possible to connect two conveyors via one stage for temporarily storing the phosphor sheets 2. This connection method is convenient since deteriorated phosphor sheets can be removed from the system or new phosphor sheets can be added thereto by use of this stage without stopping the system.

In the first embodiment described above, since the stimulable phosphor sheets 2 are fixed on the conveyor 1 in engagement with the rollers 3 and 4, the phosphor sheets 2 must be flexible. However, from the viewpoints of durability of the stimulable phosphor and formation of radiation images of high quality, it is desirable to avoid bending of the phosphor sheets. FIGS. 3 to 5B illustrate the second to fourth embodiments in which the phosphor sheets are fixed on rigid supporting materials formed to circulate the phosphor sheets without bending them.

Figure 3:
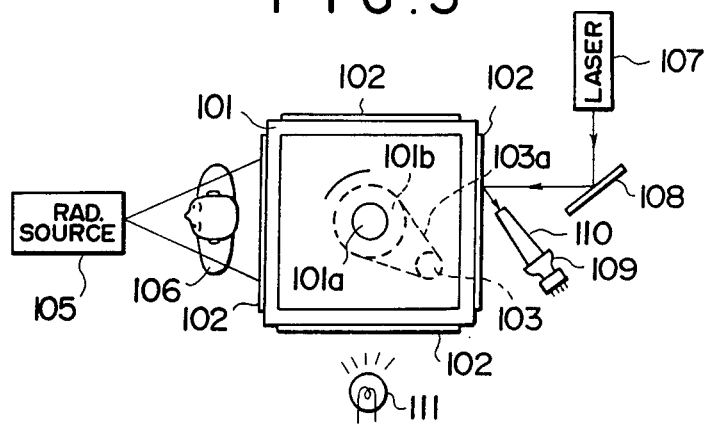
FIG. 3 is a schematic view showing the second embodiment of the apparatus in accordance with the present invention.

In FIG. 3, four stimulable phosphor sheets 102 are fixed on the sides of a quadrangular prism-like turret 101. The turret 101 is provided with a shaft 101a on which a rotation member 101b such as a sprocket wheel is fixed. The rotation member 101b receives the driving force of a drive unit 103 via a driving force transfer member 103a formed of a chain or the like. The turret 101 is rotated at 90° intervals in the direction of the arrow by the drive unit 103. A radiation source 105 is opposed to one side of the turret 101, and a gas ion laser beam source 107, a light deflector 108, a photodetector 109 and a light transfer means 110 are positioned in the vicinity of the side opposite to the aforesaid side. An erasing light source 111 is positioned to face the side of the turret 101 adjacent to the aforesaid side facing the radiation source 105 on the side upstream of turret rotation from the aforesaid side. The radiation source 105, the gas ion laser source 107 and the other parts positioned around the turret 101 may be of the same types as those used in the first embodiment shown in FIG. 2, with only the means for supporting and circulating the phosphor sheets employed in the system shown in FIG. 3 differing from that in FIG. 2. In the same way as in FIG. 2, when the turret 101 is stopped, the radiation source 105 is turned on to have the phosphor sheet 102 store a radiation transmission image of an object 106.

After the turret 101 is rotated 90° twice, the phosphor sheet 102 carrying the radiation image stored therein is stopped at the position facing the light deflector 108, the photodetector 109 and the like, and is scanned with the stimulating rays emitted from the gas ion laser beam source 107 to have the phosphor sheet 102 emit light upon stimulation thereof. The light emitted from the phosphor sheet 102 is photoelectrically read out by the photodetector 109, which outputs an electric image signal corresponding to the radiation image. In the apparatus shown in FIG. 3, since it is difficult to conduct the subsidiary scanning of the stimulating rays by the rotation of the turret 101, one of the other subsidiary scanning methods described above is employed After the radiation image is read out from the phosphor sheet 102, the turret 101 is rotated 90° to position the phosphor sheet 102 at the erasing light source 111, where the radiation energy remaining in the phosphor sheet 102 is erased for reusing the sheet In FIG. 3, the phosphor sheet 102 is free of any process at one of the four stages of the turret 101. The process-free stage is not limited to the position shown in FIG. 3. Accordingly, it is also possible to form an apparatus in which three phosphor sheets are fixed on a triangular prism-like turret. When it takes a long time to conduct the erasing step, two erasing stages may be installed.

Figure 4:
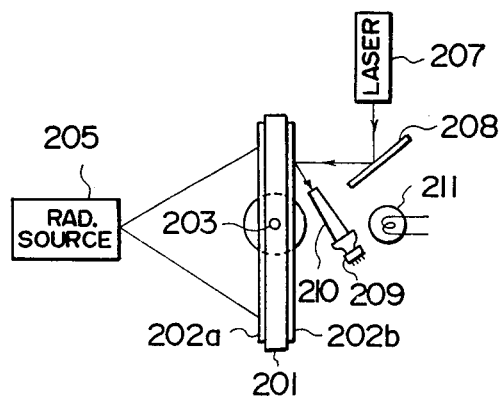
FIG. 4 is a schematic view showing the third embodiment of the apparatus in accordance with the present invention.

In the present invention, any number of stimulable phosphor sheets may be fixed on the supporting material, and the erasing zone need not be positioned independently from the zone for conducting the image recording or the image read-out. For example, in the third embodiment shown in FIG. 4, a plate-like supporting material 201 rotatable at 180° intervals around a drive shaft 203 is used, and two phosphor sheets 202a and 202b are mounted one on either side of the supporting material 201. A radiation source 205 is opposed to the phosphor sheet 202a, while a gas ion laser beam source 207, a light deflector 208, a photodetector 209, a light transfer means 210, and an erasing light source 211 are opposed to the phosphor sheet 202b. The supporting material 201 is rotated at 180° intervals via the drive shaft 203, and the image recording and the image read-out are repeated for the phosphor sheets 202a and 202b. The erasing light source 211 is turned off when the image read-out is conducted, and is turned on after the image read-out is finished. After the erasing light source 211 is turned off, the supporting material 201 is rotated to move the phosphor sheets 202a and 202b. When the plate-like supporting material 201 is used, it is of course possible to fix the phosphor sheet on only one side of thereof. In this case, however, the image recording and read-out speed drops since the image recording and the image read-out cannot be conducted simultaneously. In the embodiments of FIGS. 3 and 4, a means for cleaning the phosphor sheets, such as the cleaning roller 12 shown in FIG. 2, is not installed. However, if necessary, it is possible to use a self-traveling type cleaning roller which moves to clean the surfaces of the phosphor sheets after the erasing step.

Figure 5A:
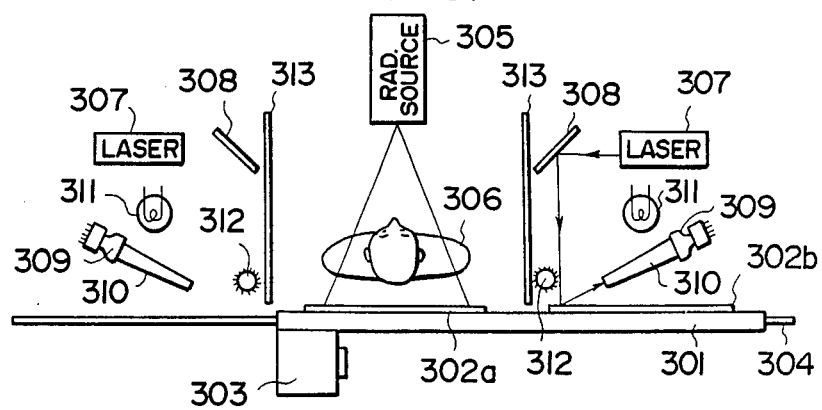
FIGS. 5A and 5B are schematic views showing the fourth embodiment of the apparatus in accordance with the present invention.
Figure 5B:
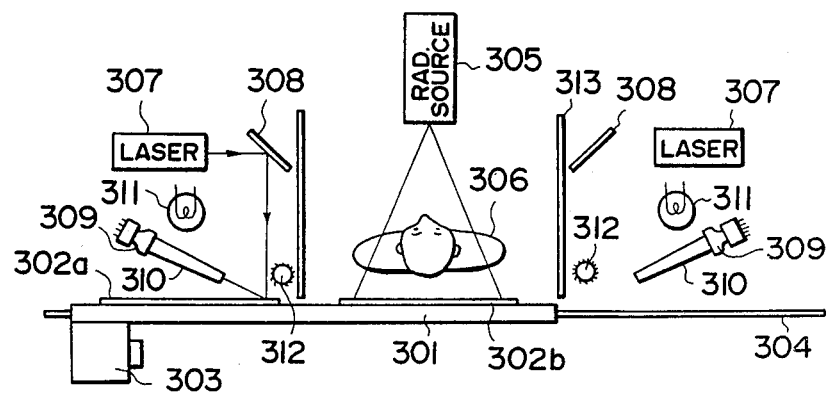

Instead of being rotated as described above, the phosphor sheet supporting material may be moved in other ways, for example, it may be linearly reciprocated. In the fourth embodiment shown in FIGS. 5A and 5B, a plate-like supporting material 301 is placed on a rail 304 for reciprocation therealong by use of a drive unit 303 for driving, for example, a pinion gear which is engaged with a rack on the side of the rail 304 to form a rack-pinion mechanism. Two phosphor sheets 302a and 302b are fixed on the supporting material 301. A radiation source 305 is positioned on the side facing the center of the rail 304, where the phosphor sheet 302a is positioned in the diagram. Image read-out sections each comprising a gas ion laser beam source 307, a light deflector 308, a photodetector 309 and a light transfer means 310 are positioned one on either side of the radiation source 305. Each image read-out section is also provided with an erasing light source 311, and isolated from the radiation source 305 by a light shielding plate 313. Cleaning rollers 312 are positioned exterior of and near to the light shielding plates 313. The supporting material 301 is reciprocated on the rail 304 by the drive unit 303, and alternately positioned as shown in FIGS. 5A and 5B. When the supporting material 301 is set in the position shown in FIG. 5A, a radiation image is recorded on the left phosphor sheet 302a, and the image read-out is conducted for the right phosphor sheet 302b. The subsidiary scanning in the image read-out step may be effected by moving the gas ion laser beam source and read-out apparatus or by moving the supporting material 301, as described above. After image read-out is finished, the erasing light source 311 is turned on for a predetermined length of time to erase the residual radiation energy on the phosphor sheet 302b. At this time, since the light emitted from the erasing light source 311 is shielded by the light shielding plate 313, the radiation image stored on the phosphor sheet 302a is not adversely affected by the erasing light. After the erasing step for the phosphor sheet 302b is finished, the supporting material 301 is moved to the left. At this time, the cleaning roller 312 is moved from the retracted position shown in the diagram to a position in contact with the phosphor sheet 302b, and cleans the surface of the phosphor sheet 302b being moved to left. After the phosphor sheet 302b has passed by the cleaning roller 312, the cleaning roller 312 is returned to the retracted position. After the supporting material 301 is moved to the position shown in FIG. 5B, the radiation image stored on the left phosphor sheet 302a in the condition shown in FIG. 5A is read out, and the image recording is conducted for the erased and cleaned right phosphor sheet 302b. Thereafter, the supporting material 301 is returned to the position shown in FIG. 5A, while the erasing and cleaning is effected for the left phosphor sheet 302a to make it reusable. When it is not necessary to increase the speed of this system, only one phosphor sheet may be used, and the image recording and the image read-out may be alternately conducted.

In order to obtain a radiation image having an excellent diagnostic efficiency and accuracy, it is preferable to investigate the recording condition or the recording pattern of the radiation image stored on the stimulable phosphor sheets before conducting the read-out, and to set the read-out gain of the photoelectric read-out means, the scale factor, and the signal processing conditions based on the recording condition or pattern. For this purpose, it is proposed to read out the pattern of the radiation image in advance by use of stimulating rays of low energy (this operation is referred to as the preliminary read-out), and then to determine the read-out condition and conduct the read-out for obtaining a radiation image for use in diagnosis (this operation is referred to as the final read-out), as disclosed in U.S. patent application Ser. No. 434,886. In the present invention, the preliminary read-out may be conducted by installing a preliminary read-out section on the side upstream from the aforesaid image read-out section, or by using the aforesaid image read-out section both for preliminary read-out and for final read-out.

In the embodiments of FIGS. 2 to 5A, at least one phosphor sheet is fixed on the supporting material. However, it is also possible to use an endless supporting material provided with a stimulable phosphor layer directly formed thereon. For example, the phosphor layer may be formed on the surface of an endless belt or a rotatable drum. The fifth to seventh embodiments of the system having such a configuration are described below with reference to FIGS. 6 to 9.

Figure 6:
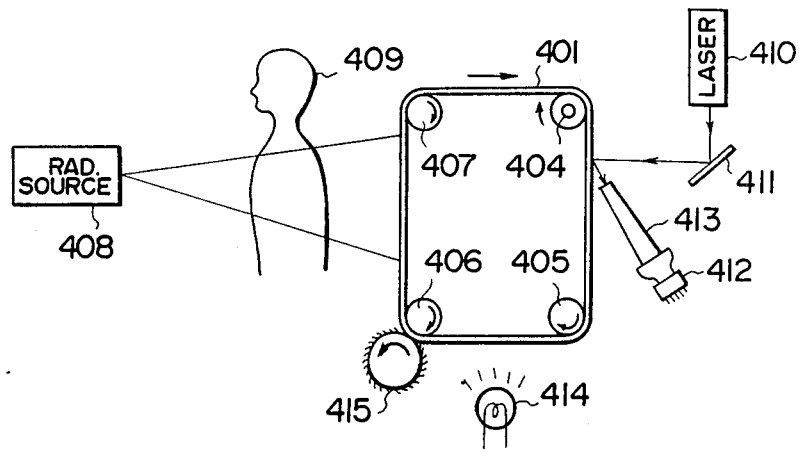
FIG. 6 is a schematic view showing the fifth embodiment of the apparatus in accordance with the present invention.
Figure 7:
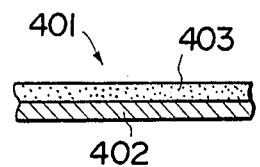
FIG. 7 is an enlarged side view showing a part of the apparatus shown in FIG. 6.

In FIG. 6, an endless belt-like recording member 401 is used. As shown in FIG. 7, the recording member 401 is provided with a stimulable phosphor layer 403 (recording material) formed on the surface of a flexible endless belt-like supporting material 402. The recording member 401 is applied on a cylindrical driving roller 404 and cylindrical driven rollers 405, 406 and 407, and is moved in the direction of the arrow by the driving roller 404 which is rotated by a drive unit (not shown). A radiation source 408 is positioned on the side facing the portion of the recording member 401 between the driven rollers 406 and 407. The radiation source 408, which may be an X-ray source or the like, projects a radiation transmission image of an object 409 positioned between the radiation source 408 and the portion of the recording member 401 between the driven rollers 406 and 407 onto the recording member 401. A gas ion laser beam source 410 for emitting stimulating rays, a light deflector 411 formed of a galvanometer mirror or the like for deflecting the stimulating rays emitted from the gas ion laser beam source 410 in the width direction of the recording member 401, and a photodetector 412 for reading out the light emitted from the phosphor layer 403 upon stimulation thereof by the stimulating rays are opposed to the portion of the recording member 401 between the driving roller 404 and the driven roller 405. The photodetector 412, which may be formed of a head-on type photomultiplier, a photoelectric amplification channel plate or the like, photoelectrically detects the light emitted from the phosphor layer 403 upon stimulation thereof and guided by a light transfer means 413. An erasing light source 414 is positioned to face the portion of the recording member 401 between the driven rollers 405 and 406. The erasing light source 414 emits light having a wavelength within the stimulation wavelength range of the phosphor layer 403 onto the phosphor layer 403 to cause it to emit the radiation energy stored therein. The erasing light source 414 may be formed, e.g., of a tungsten-filament lamp, halogen lamp, infrared lamp, or laser source as described in U.S. Pat. No. 4,400,619. Since the radiation energy stored in the phosphor layer 403 can also be eliminated by heating it as disclosed, for example, in Japanese Unexamined Patent Publication No. 56(1981)-12599, the erasing light source 414 may be replaced by a heating means. A cylindrical cleaning roller 415 is opposed to the driven roller 406 with the recording member 401 intervening therebetween. The cleaning roller 415 is rotated counterclockwise in the diagram by a drive unit (not shown), and removes dust and the like from the surface of the recording member 401 moving in contact with the cleaning roller 415. If necessary, the cleaning roller 415 may be of an electrostatic attraction type.

The light transfer means 413 may be of the same type as the light transfer means 10 shown in FIG. 2.

The radiation image recording and read-out apparatus shown in FIG. 6 is operated as described below. The recording member 401 is intermittently moved by a distance corresponding to one-fourth of the entire circumference thereof by the driving roller 404. When the recording member 401 is stopped, the radiation source 408 is turned on to cause the phosphor layer 403 of the recording member 401 between the driven rollers 406 and 407 to store the radiation transmission image of the object 409. After the recording member 401 has been moved by twice the distance of one-fourth its circumference, the portion of the phosphor layer 403 carrying the radiation image stored thereon is positioned between the driving roller 404 and the driven roller 405, and scanned with the stimulating rays emitted from the gas ion laser beam source 410. Scanning is conducted in the width direction of the recording member 401 (main scanning) by the light deflector 411, and also in the length direction of the recording member 401 (subsidiary scanning) by the movement of a stage (not shown) carrying the gas ion laser beam source 410, the light deflector 411, the photodetector 412 and the light transfer means 413 in the length direction of the recording member 401. The stage can be easily formed by use of a known linear movement mechanism. Upon exposure to the stimulating rays, the phosphor layer 403 emits light in the pattern of the radiation image stored therein. The emitted light is inputted to the photodetector 412 via the light transfer means 413, and an electric signal corresponding to the radiation image stored in the phosphor layer 403 is outputted from the photodetector 412. After the radiation image is read out in this way, the recording member 401 is further moved by the distance of one-fourth the circumference thereof and stopped. In this condition, the portion of the phosphor layer 403 from which the radiation image has been read out is positioned between the driven rollers 405 and 406, and exposed to the erasing light emitted from the erasing light source 414 to eliminate the radiation energy of the radiation image remaining in the phosphor layer 403 after the read-out step, the radiation emitted from radioactive isotopes such as $^{226}$Ra and $^{40}$K existing in trace amounts in the stimulable phosphor, and environmental radiations stored in the stimulable phosphor. In this way, the phosphor layer 403 is restored to the condition usable for recording a further radiation image. Thereafter, the recording member 401 is moved until the erased portion of the phosphor layer 403 is positioned between the driven rollers 406 and 407. Midway during this movement, dust on the surface of the recording member 401 is removed by the cleaning roller 415. The recording member 401 free from any radiation energy and dust is reused to record a radiation image at the radiation source 408.

As described above, the recording member 401 is circulated and reused through the erasing step conducted by the erasing light source 414 and the cleaning step effected by the cleaning roller 415. A portion of the recording member 401 passes through the image recording, image read-out and image erasing steps while the recording member 401 rotates one turn. It is, of course, possible to simultaneously conduct these three steps for three different portions of the recording member 401, respectively, when the recording member 401 is stopped. In this case, it is possible to improve the image recording and read-out speed.

In the embodiment shown in FIG. 6, since the phosphor layer 403 is fixed on the endless belt-like supporting material 402 and reused through the circulation of the supporting material 402, there is no risk of the stimulable phosphor being damaged as is likely to happen in the method in which discrete phosphor sheets are conveyed one by one. Further, since the mechanism for circulating the phosphor can be formed of only a simple endless belt drive mechanism, the system is easy to design and manufacture. Also, since a single recording member 401 is circulated and reused, the quality of the reproduced images does not fluctuate.

In the same way as in the first embodiment, the electric image signal obtained from the photodetector 412 may immediately be sent to a reproducing apparatus to reproduce the radiation image as a hard copy or display it on a CRT, or may be digitized and temporarily stored on a high-density recording medium such as a magnetic tape, magnetic disk or optical disk to later reproduce the radiation image therefrom.

In the fifth embodiment shown in FIG. 6, the subsidiary scanning for reading out the radiation image is conducted by moving the gas ion laser beam source and read-out apparatus with respect to the recording member 401 when it is halted. However, it is also possible to maintain the gas ion laser beam source and read-out apparatus stationary, and move the recording member 401 to conduct the subsidiary scanning. For this purpose, the recording member 401 may be moved at the subsidiary scanning speed after the image recording is over, and the read-out may be carried out during this movement of the recording member 401. It is also possible to conduct the image recording by use of the slit exposure method while the recording member 401 is being moved, thereby to effect the image recording and the image read-out without stopping the recording member 401.

Figure 8:
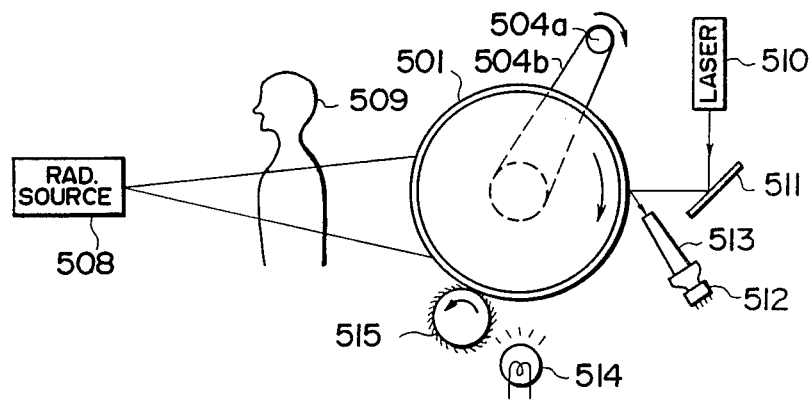
FIG. 8 is a schematic view showing the sixth embodiment of the apparatus in accordance with the present invention.
Figure 9:
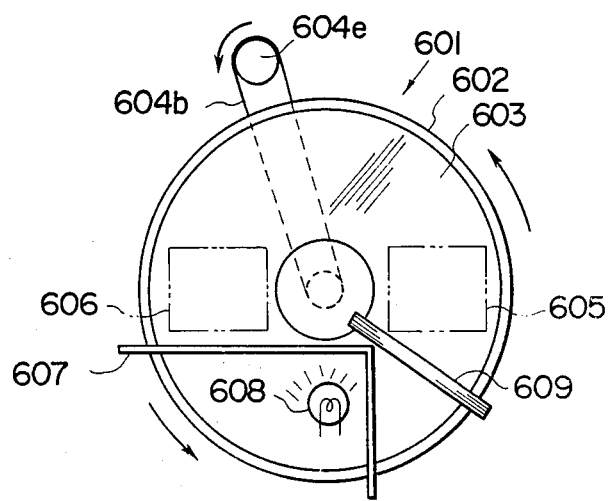
FIG. 9 is a schematic view showing the seventh embodiment of the apparatus in accordance with the present invention.

In the fifth embodiment shown in FIG. 6, an endless belt-like recording member 401 which is flexible and can be bent freely is used. However, from the viewpoint of durability of the recording material and formation of fine radiation images, it is desirable that the recording material be rigid and not be bent during its use. FIGS. 8 and 9 show the sixth and seventh embodiments in which a rigid recording material is used.

In FIG. 8, a recording member 501 is comprised of a stimulable phosphor provided on the peripheral surface of a drum-like supporting material. The recording member 501 receives the driving force of a driving shaft 504a of a drive unit (not shown) via a chain 504b, and the recording member 501 is intermittently rotated in the direction of the arrow. Around the drum-like recording member 501 are positioned a radiation source 508, a gas ion laser beam source 510, a light deflector 511, a photodetector 512, a light transfer means 513, an erasing light source 514, and a cleaning roller 515, which are of the same types as those employed in FIG. 6. The apparatus shown in FIG. 8 is similar to that shown in FIG. 6, except that the recording member 501 has a different shape and is driven in a different way. In the same way as in FIG. 6, the recording member 501 is exposed to a radiation passing through an object 509 to have a radiation image stored therein, and scanned with stimulating rays emitted from the gas ion laser beam source 510 to obtain an electric signal corresponding to the radiation image from the photodetector 512.

In FIG. 9, a recording member 601 is comprised of a stimulable phosphor layer 603 provided on the side of a disk-like supporting material 602. The recording member 601 is intermittently rotated one-fourth turn at a time in the direction of the arrow by a driving shaft 604a of a drive unit (not shown) via a chain 604b. Above the phosphor layer 603 is positioned an image recording zone 605, in which the phosphor layer 603 is exposed to a radiation passing through an object (not shown) to have a radiation image stored therein. In the position spaced 180° apart from the image recording zone 605 is located an image read-out zone 606 provided with an image read-out apparatus (not shown) comprising a gas ion laser beam source, a scanning means such as a light deflector, a photodetector and a light transfer means of the type described above. Downstream of the image read-out zone 606 is positioned an erasing light source 608 surrounded by a light shielding member 607. A cleaning roller 609 is positioned downstream of the erasing light source 608 and upstream of the image recording zone 605. Also in the apparatus shown in FIG. 9, the recording member 601 is circulated and reused while the erasing and cleaning are conducted by use of the erasing light source 608 and the cleaning roller 609. In this seventh embodiment, since the phosphor layer 603 is moved on a plane, the light shielding member 607 is employed to prevent the erasing light emitted from the erasing light source 608 from adversely affecting the image recording zone 605 and the image read-out zone 606. The light shielding member may also be employed in the embodiments shown in FIGS. 6 and 8, if necessary.

In the embodiments of FIGS. 8 and 9, since the recording material is formed rigidly and is not bent during operation, it exhibits higher durability, yields a finer visible image, and is easier to manufacture than an endless belt-like recording material.

In the embodiments shown in FIGS. 6, 8 and 9, the recording material is intermittently rotated one-fourth turn at a time. However, it is of course possible to rotate the recording material at different intervals. For example, in the apparatus shown in FIG. 8, the recording material may be installed in a triangular form and intermittently rotated one-third turn each time. Further, it is not always necessary to position the erasing zone independently of the image recording zone or the image read-out zone. For example, the erasing light source may be positioned within the image read-out zone, and used in such a way that it is turned off during the image read-out operation and turned on after the image read-out is finished. In this case, it is possible to rotate the recording material a half turn at a time. Although it is not always necessary to clean the recording material by use of the cleaning roller, cleaning is effective to improve the quality of the reproduced radiation image.

In the embodiments described above, a plurality of stimulable phosphor sheets or a plurality of portions of a phosphor layer are sequentially passed through the recording, read-out and erasing steps to sequentially conduct the recording, read-out and erasing for each phosphor sheet or each phosphor layer portion. However, it is also possible to first conduct the recording for all phosphor sheets or phosphor layer portions, and then collectively carry out the read-out for all radiation images stored therein, followed by collective erasing. The erasing may be conducted immediately after reading out each radiation image. This method is useful for continuous radiography, for example, angiography and kymography.

For this purpose, in FIG. 2, the phosphor sheets 2 may be positioned on the endless belt 1 over the entire circumference thereof in closely and equally spaced relation, and the recording may first be conducted for all phosphor sheets 2 by rotating the endless belt 1 one turn (at this time, the read-out and erasing apparatus are turned off). In this case, the read-out and the erasing may be conducted during the next rotation of the endless belt 1. Or, in FIG. 6, a stacker section may be formed to temporarily store a part of the endless belt-like recording member 401 in the zigzag form after a plurality of radiation images are recorded thereon, and thereafter to send this part to the read-out section to collectively read out the radiation images stored on that part. In FIG. 6, it is of course possible to collectively conduct the recording, read-out and/or erasing as described above with reference to FIG. 2. Conversely, the aforesaid stacker section may be formed in the apparatus shown in FIG. 2. It should be understood that the aforesaid method in which the recording is collectively conducted, followed by collective read-out/erasing (or collective read-out and collective erasing), can be employed in any of the first to seventh embodiments described above.

Figure 10:
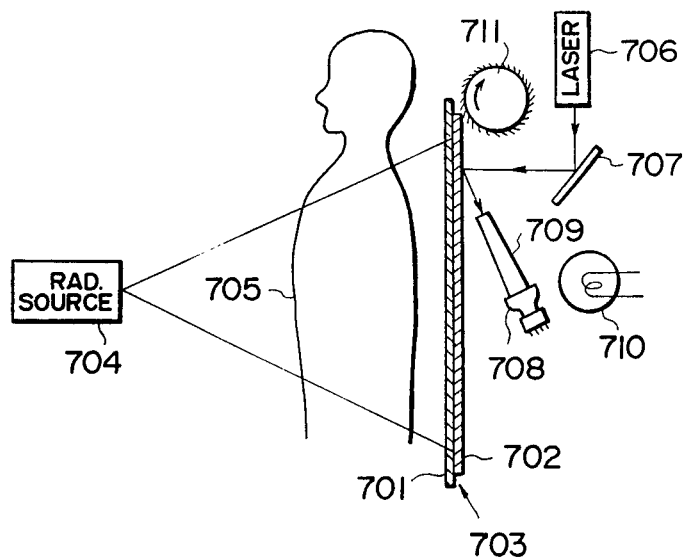
FIG. 10 is a schematic view showing the eighth embodiment of the apparatus in accordance with the present invention.
Figure 11:
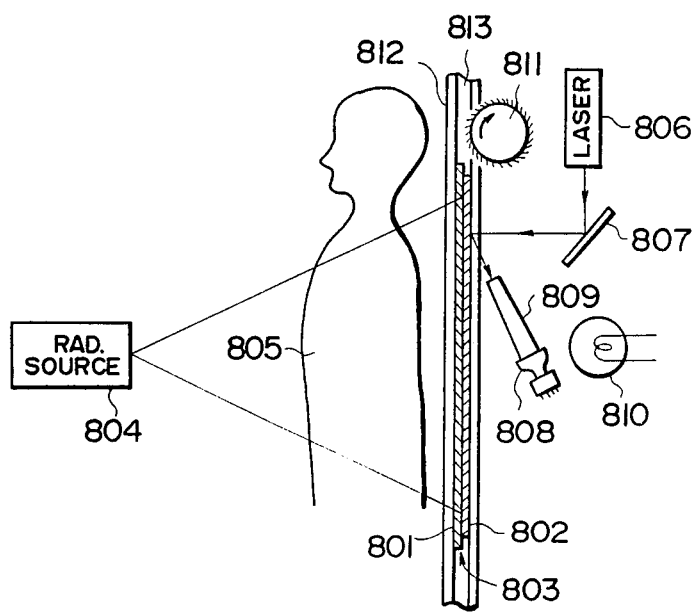
FIG. 11 is a schematic view showing the ninth embodiment of the apparatus in accordance with the present invention.

In the present invention, it is also possible to use one recording material fixed on a plate-like supporting material, and repeat the image recording, read-out, and erasing steps for the recording material, as shown in FIGS. 10 and 11.

In FIG. 10 showing the eighth embodiment of the apparatus in accordance with the present invention, a recording member 703 provided with a stimulable phosphor layer 702 on the surface of a stationary supporting material 701, which is made of a plate-like radiation transmitting material, is used to record radiation images. A radiation source 704 is opposed to the supporting material 701 of the recording member 703. The radiation source 704 may be an X-ray source or the like, and projects a radiation transmission image of an object 705, which is positioned between the radiation source 704 and the recording member 703, onto the phosphor layer 702 through the supporting material 701 to have the radiation image stored in the phosphor layer 702. On the phosphor layer side of the recording member 703 are positioned a gas ion laser beam source 706 for emitting stimulating rays, a light deflector 707 formed of a galvanometer mirror or the like for deflecting the stimulating rays emitted from the gas ion laser beam source 706 in the width direction of the recording member 703, a photodetector 708 for reading out the light emitted from the phosphor layer 702 upon stimulation thereof by the stimulating rays, and a light transfer means 709 for guiding the light emitted from the phosphor layer 702, which are mounted on a common stage (not shown). The photodetector 708 may be formed of a head-on type photomultiplier, a photoelectric amplification channel plate or the like, and photoelectrically detects the light emitted from the phosphor layer 702 upon stimulation thereof and guided by the light transfer means 709.

The light transfer means 709 may be of the same type as those employed in the above-mentioned embodiments. An erasing light source 710 is opposed to the phosphor layer 702 of the recording member 703, and the aforesaid stage also supports a cylindrical cleaning roller 711 which is rotated in the direction of the arrow by a drive unit (not shown). The erasing light source 710 emits light having a wavelength within the stimulation wavelength range of the phosphor layer 702 onto the phosphor layer 702 to cause it to emit the radiation energy stored therein. The erasing light source 710 may be formed, e.g., of a tungsten-filament lamp, halogen lamp, infrared lamp, or laser source as described in U.S. Pat. No. 4,400,619. Since the radiation energy stored in the phosphor layer 702 can also be eliminated by heating as disclosed, for example, in Japanese Unexamined Patent Publication No. 56(1981)-12599, the erasing light source 710 may be replaced by a heating means. The cleaning roller 711 rotates and moves in contact with the recording member 703 to remove dust and the like from the surface of the phosphor layer 702. If necessary, the cleaning roller 711 may be of an electrostatic attraction type.

The apparatus shown in FIG. 10 is operated as described below. After the object 705 is positioned between the recording member 703 and the radiation source 704, the radiation source 704 is turned on to cause the phosphor layer 702 to store the radiation transmission image of the object 705. After the recording of the radiation image is over, the gas ion laser beam source 706 is turned on to scan the phosphor layer 702 with the stimulating rays. Scanning is conducted in the width direction of the recording member 703 (main scanning) by the light deflector 707, and also in the vertical direction of the recording member 703 (subsidiary scanning) by the downward movement of the stage carrying the gas ion laser beam source 706, the light deflector 707, the photodetector 708, the light transfer means 709 and the cleaning roller 711. The stage can be easily formed by use of a known linear movement mechanism. Upon exposure to the stimulating rays, the phosphor layer 702 emits light in the pattern of the radiation image stored therein. The emitted light is inputted to the photodetector 708 via the light transfer means 709, and an electric signal corresponding to the radiation image stored in the phosphor layer 702 is obtained from the photodetector 708. When the stage is moved down to conduct the subsidiary scanning, the cleaning roller 711 mounted on the stage is rotated to clean the surface of the phosphor layer 702. When the image read-out is finished and the whole surface of the phosphor layer 702 has been cleaned, the stage is returned to the waiting position above the recording member 703. Thereafter, the erasing light source 710 is turned on for a predetermined length of time, and the phosphor layer 702 is exposed to the erasing light emitted therefrom to eliminate the radiation energy of the radiation image remaining in the phosphor layer 702 after the read-out step, the radiation emitted from radioactive isotopes such as $^{226}$Ra and $^{40}$K existing in trace amounts in the stimulable phosphor, and environmental radiations stored in the stimulable phosphor. In this way, the phosphor layer 702 is restored to the condition usable for recording a further radiation image. The recording member 703 which is now free from radiation energy and dust is reused to record a radiation image.

In the embodiment shown in FIG. 10, since the stimulable phosphor is not moved, the mechanism is very simple, and the system can be easily designed and manufactured. Further, since one recording material is used repeatedly, sheet control is easy and uniform visible images can be obtained.

FIG. 11 shows the ninth embodiment of the apparatus in accordance with the present invention, in which the subsidiary scanning for reading out the radiation image is conducted by moving the recording material with respect to the gas ion laser beam source and image read-out apparatus fixed in the image read-out zone. Like the apparatus shown in FIG. 10, the apparatus shown in FIG. 11 employs a recording member 803 comprising a stimulable phosphor layer 802 formed on a supporting material 801 made of a radiation transmitting material, and is provided with a radiation source 804, a gas ion laser beam source 806, a light deflector 807, a photodetector 808, a light transfer means 809, an erasing light source 810, and a cleaning roller 811, which are of the same types as those employed in FIG. 10. However, unlike the embodiment shown in FIG. 10, the gas ion laser beam source 806, the light deflector 807, the photodetector 808, and the light transfer means 809 are fixed and do not move. The edges of the recording member 803 are fitted to the central grooves 813 of two vertically extending rails 812, and the recording member 803 can be vertically moved along the rails 812 by use of a linear movement mechanism (not shown) such as a rack-pinion mechanism. After the recording member 803 is exposed to a radiation coming from the radiation source 804 through an object 805 to have a radiation image stored therein, the recording member 803 is scanned with the stimulating rays to read out the radiation image. At this time, the main scanning is conducted by use of the light deflector 807 in the same way as in FIG. 10, and the subsidiary scanning is effected by moving up the recording member 803 by use of the linear movement mechanism. As the recording member 803 is moved, the rotating cleaning roller 811 contacts it to remove dust therefrom. After the image read-out is finished and the recording member 803 is returned downward, the erasing light source 810 is turned on to erase the residual radiation image on the recording member 803.

In the embodiment of FIG. 11, the stimulable phosphor is moved to conduct the subsidiary scanning by moving the plate-like supporting material. A movement mechanism of this type can be formed more easily than a mechanism for conveying the sheet-like phosphors one by one.

In the embodiments shown in FIGS. 10 and 11, the stimulable phosphor is provided on a supporting material made of a radiation transmitting material and positioned on the side of the supporting material opposite to the radiation source. However, this configuration may be changed as desired. For example, the stimulable phosphor may be formed on a supporting material made of a material which cannot transmit a radiation, and may be positioned on the side facing the radiation source. In this case, it is possible to form the apparatus so that, after the object moves away from the recording material, the gas ion laser beam source and the read-out apparatus are moved to the vicinity of the recording material. In case the supporting material is pervious to the stimulating rays and the light emitted from the stimulable phosphor upon stimulation thereof, it is possible to position the radiation source on the side facing the stimulable phosphor, and position the read-out apparatus on the side facing the supporting material.

In the embodiments of FIGS. 10 and 11, since only one recording material is used repeatedly, it can be easily replaced with a new one when the quality of the visible image reproduced therefrom drops. Thus, these embodiments greatly facilitate the quality control of the recording material. In these embodiments, after the movement of the phosphor relative to the image read-out section conducted for the subsidiary scanning is finished for one radiation image, the phosphor and the image read-out section are returned to the original position with respect to each other, and the subsidiary scanning movement is repeated. The movement for returning them to the original position corresponds to the movement of phosphor sheets for passing through the read-out section one after another in the above-mentioned embodiments in which many phosphor sheets are formed on the supporting material.

We claim:

1. A radiation image recording and read-out method including the steps of:
   (i) recording a radiation image of an object on a recording material comprising a stimulable phosphor layer by exposing said recording material to a radiation passing through the object to have the radiation absorbed in said recording material, and
   (ii) scanning said recording material carrying said radiation image stored therein with a laser beam which has a wavelength within the stimulation range of said stimulable phosphor and which causes said recording material to emit light in the pattern of said radiation image stored therein upon stimulation thereof by using a gas ion laser beam, the wavelength of which is selected to improve read-out efficiency and wherein the selected wavelength is at least 480 nm and less than 600 nm, and reading out the emitted light by use of a photoedetector to obtain an electric signal corresponding to said radiation image.

2. A method as defined in claim 1 wherein said gas ion laser beam is an $Ar^+$ laser beam.

3. A method as defined in claim 1 wherein said gas ion laser beam is a $Kr^+$ laser beam.

4. A method as defined in claim 1 wherein said gas ion laser beam is an $Ar^+$-$Kr^+$ laser beam.

5. A radiation image recording and read-out apparatus including:
   (i) at least one recording material comprising a stimulable phosphor layer and absorbing a radiation passing through an object to store a radiation image of said object therein,
   (ii) a gas ion laser beam source having a wavelength within a stimulable range of said stimulable phosphor and used to scan said recording material carrying said radiation image stored therein to have said recording material emit light in the pattern of said radiation image upon stimulation thereof, wherein the wavelength of the gas ion laser is selected to improve read-out efficiency, said selected wavelength being at least 480 nm and less than 600 nm, and
   (iii) a photodetector means for reading out said emitted light and converting it onto an electric signal corresponding to said radiation image.

6. An apparatus as defined in claim 5 wherein said gas ion laser beam source is an $Ar^+$ laser beam source.

7. An apparatus as defined in claim 5 wherein said gas ion laser beam source is a $Kr^+$ laser beam source.

8. An apparatus as defined in claim 5 wherein said gas ion laser beam source is an $Ar^+$-$Kr^+$ laser beam source.

9. A radiation image recording and read-out apparatus comprising:
   (i) a supporting material,
   (ii) at least one recording material fixed on said supporting material and comprising a stimulable phosphor layer storing a radiation image,
   (iii) an image recording section for exposing said recording material to a radiation passing through an object to have a radiation image of the object stored in said recording material,
   (iv) an image read-out section provided with a gas ion laser beam source which emits a laser beam having a wavelength selected to improve read-out efficiency, said selected wavelength being at least 480 nm and less than 600 nm, said laser beam being used for scanning said recording material carrying said radiation image stored therein, and a photodetector means for reading out light emitted from said recording material scanned and stimulated with the laser beam emitted from said laser beam source and converting the emitted light to an electric signal corresponding to said radiation image,
   (v) a means for circulating said recording material on said supporting material with respect to said image read-out section by repeatedly moving said supporting material and said image read-out section with respect to each other, and
   (vi) an erasing means for eliminating the radiation energy remaining in said recording material prior to image recording on said recording material after the radiation image is read out therefrom at said image read-out section.

10. An apparatus as defined in claim 9 wherein said gas ion laser beam source is an $Ar^+$ laser beam source.

11. An apparatus as defined in claim 9 wherein said gas ion laser beam source is a $Kr^+$ laser beam source.

12. An apparatus as defined in claim 9 wherein said gas ion laser beam is an $Ar^+$-$Kr^+$ laser beam source.

13. An apparatus as defined in any of claims 9 to 12 wherein said supporting material is an endless supporting material.

14. An apparatus as defined in claim 13 wherein said endless supporting material is an endless belt.

15. An apparatus as defined in claim 13 wherein said endless supporting material is a rotatable drum.

16. An apparatus as defined in claims 9, 10, 11 or 12 wherein said recording material is a stimulable phosphor layer formed on said supporting material.

17. An apparatus as defined in any of claims 9, 10, 11 or 12 wherein said recording material is a stimulable phosphor sheet releasably secured to said supporting material.

18. An apparatus as defined in any of claims 9, 10, 11 or 12 wherein means are provided for circulating said supporting material between said image recording section and said image read-out section.

19. An apparatus as defined in claim 9, wherein said supporting material is a plate-like supporting material.

20. An apparatus as defined in claim 19 wherein said plate-like supporting material is made of a radiation transmitting material and is stationary with respect to said image read-out section, and the apparatus is formed in such a way that said image recording section conducts image recording on said recording material from one side of said supporting material, and said image read-out section conducts image read-out from the other side of said supporting material.

21. An apparatus as defined in claim 19 comprising means for moving said plate-like supporting material with respect to said image read-out section for conducting scanning with the laser beam.

* * * * *